Patented July 25, 1950

2,516,276

UNITED STATES PATENT OFFICE 2,516,276

METHOD OF PREPARING ARSENIC COMPOUNDS

Benjamin F. Tullar, Grosse Pointe Woods, Mich., assignor to Parke, Davis & Company, Detroit, Mich., a corporation of Michigan No Drawing. Application January 31, 1944, Serial No. 520,552

4 Claims. (Cl. 260—440)

The invention relates to new and improved salts derived from 3-amino-4-hydroxyphenylarsenoxide.

The known 3-amino-4-hydroxyphenylarsenoxide compounds and their salts are extremely sensitive chemicals which tend to be rendered more unstable by contact with heat, moisture and air or oxygen, or by exposure to light or by combinations of these circumstances. They are also subject to serious alteration upon storage whenever contaminated by, or combined with, small amounts of foreign chemicals or solvents which may have been used in their preparation. It is thought that the great effectiveness of 3 - amino - 4 - hydroxyphenylarsenoxide and its salts in treating syphilis and for other therapeutic purposes is related in some way to this inherent sensitivity and chemical reactivity. Experience has shown that there are numerous difficulties in the way of making even the slightest improvement in chemical stability of salts of this particular arsenoxide without at the same time decreasing the therapeutic effectiveness of such compounds.

A product intended for intravenous administration must be stable under the conditions that prevail from the time of ampouling the product until it is actually injected. Moreover, it must be a clear and particle-free solution or else a solid which will dissolve in a reasonable length of time, say 3 minutes, to form such a solution upon the addition of a suitable sterile solvent. The hydrochloride of 3-amino-4-hydroxyphenylarsenoxide obtainable on the market at the present time is prepared by precipitation by means of organic solvents. Such hydrochloride dissolves quickly enough in aqueous solvent, but is too sensitive to heat, even when dry, to constitute a safe, effective and reliable product for storage and use in tropical climates. The apparent reason for this is, that the solvents used for dissolving the amine free base and precipitating the hydrochloride, such as alcohol, ether, acetone, dioxane, etc., always combine in varying amount with the arsenical hydrochloride, probably at the arsenic group. This results in a mixture of uncertain composition which is not sufficiently stable at the higher temperatures of storage and use encountered in tropical countries. It is also difficult to control each manufactured lot of this dry organic solvent-precipitated hydrochloride and its mixtures with neutralizing agents so that it is sufficiently stable even for use in temperate climates. Although it is possible to produce satisfactory commercial lots for use in temperate climates, the skill and care necessary to provide a safe and effective product by the known methods is such that the final product must be marketed at a relatively high cost per gram.

An object of this invention is to provide new derivatives of 3-amino-4-hydroxyphenylarsenoxide, and also dry mixtures of the same with neutralizing agents, which constitute products that are stable and effective for therapeutic purposes in tropical climates and under conditions where relatively high temperatures and strong sunlight are encountered. A further object is to provide such derivatives and mixtures which can be made by methods which will insure uniformity of product at a minimum cost of production.

A further object is to provide new compositions that are stable and effective under the various conditions which may prevail from the time of their ampouling until they are applied to, or injected into, the patient by the physician and which will at the same time completely dissolve within a reasonable time, such as 2 or 3 minutes, in a suitable sterile aqueous solvent and which thereby yield clear, particle-free solutions.

I tried to attain the above objects by preparing the hydrochloride of 3-amino-4-hydroxyphenylarsenoxide from aqueous solution and in the absence of organic solvents in order to avoid the above mentioned unfavorable effects of the organic solvents. I was able to prepare the hydrochloride of 3-amino-4-hydroxyphenylarsenoxide by dissolving the crystalline free base hydrate, which is described in United States Patent No. 2,221,817, in one equivalent of aqueous hydrochloric acid of such strength that a 40–50% solution of the arsenical was obtained, cooling the solution to about 0° C. and allowing it to stand at that temperature with occasional scratching to bring about crystallization, and then filtering and drying the crystallizing material in vacuo. The product thereby obtained analyzes properly ($C_6H_7O_2NAsCl$) for pure anhydrous hydrochloride of 3-amino-4-hydroxyphenylarsenoxide. However, it exhibits a peculiar undesirable slow solubility, either alone or mixed with alkaline or basic neutralizing compound, such as alkali carbonate or hydroxide. As much as 15–30 minutes is required for the milky suspension, which first forms upon adding water to this particular hydrochloride, to change into a clear solution.

This crystalline anhydrous hydrochloride is therefore unsuitable for practical therapeutic use, mainly because of its delayed solubility. In view of its properties, it seems likely that this compound can be represented by Formula A in the following equilibrium and will not dissolve until it is slowly converted to its hydrated form, B.

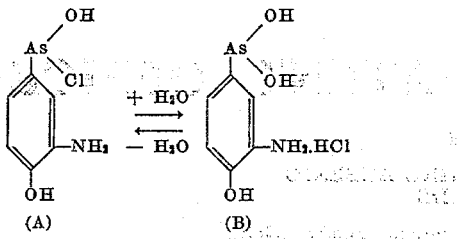

In the above mentioned preparation of A from the crystalline free base hydrate of United States Patent No. 2,221,817, the hydrochloride product, A, crystallizes only very slowly, even at 0° C. The free base starting material from United States Patent No. 2,221,817 is a hydrated arsenical of formula, C,

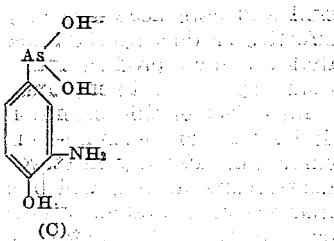

In preparing the unsatisfactory and slowly soluble compound, A, from the hydrated free base C as described above, it appears that the hydrochloric acid reacts with C to give B and the slow rate of crystallization of A is due to the time required for B to change into A and precipitate.

Since slowly soluble product A was unsuitable, I tried to prepare a more rapidly soluble hydrochloride from concentrated aqueous solution by vacuum drying. Here again I obtained the crystalline but slowly soluble product, A.

I have now discovered that, when an aqueous solution of 3-amino-4-hydroxyphenylarsenoxide containing sufficient of an acid, such as hydrochloric acid, to neutralize the amino group of said arsenoxide is frozen and dried in the frozen state to a dry powder, with the last traces of moisture removed at temperatures above freezing, such as ordinary room temperature, an anhydrous product is obtained which is rapidly soluble in water and is far more stable under conditions of use than the known product obtained by precipitation by means of organic solvents.

My new hydrochloride is entirely free from organic solvents and is much more stable than the known hydrochloride obtained by using organic solvents. It also is a distinctly different chemical compound from the slowly soluble definitely crystalline hydrochloride A, since it is readily soluble in organic solvents such as absolute ethyl alcohol, dioxane, ethylene glycol monoethyl ether ("cellosolve"), acetone, etc., whereas A is insoluble in these solvents. It appears that my new hydrochloride and analogous salts of other acids can be represented by the general formula,

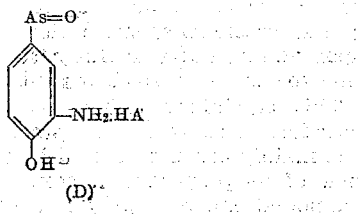

where A is the anion of a suitable organic or inorganic acid. For example, the sulfate and citrate salts have the formulas,

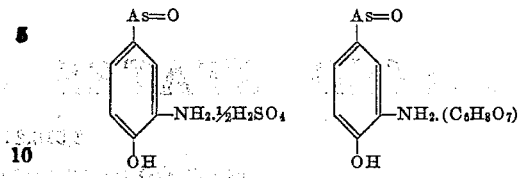

The following examples illustrate the preparation of my new hydrochloride, as well as preparation of analogous salts of acids other than hydrochloric acid, which come within the scope of the invention.

*Example*

21.7 grams of crystalline 3-amino-4-hydroxyphenylarsenoxide, prepared as described in United States Patent No. 2,221,817, is dissolved in 50 cc. of dilute hydrochloric acid solution prepared by adding water to 8.6 cc. of 36% hydrochloric acid until a volume of 50 cc. is obtained. This solution of the oxide hydrochloride is frozen in a thin layer covering the large inner surface of a container and the container then connected to a high vacuum until the solid hydrochloride appears to the eye to be completely dry. The last traces of moisture are then driven off of the hydrochloride cake by continuing to apply the vacuum while allowing the container to warm up to room temperature. The vacuum is then broken and the dry hydrochloride of 3-amino-4-hydroxyphenylarsenoxide having the formula,

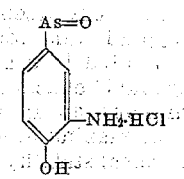

is filled into sterile ampoules under anhydrous conditions and sealed. The product thus obtained is stable, even in tropical countries, for many months and is ready for use. The contents of an ampoule of this product will instantly and completely dissolve in water so as to be ready for immediate use.

The hydrochloride of this example is soluble in water to the extent of at least 50%.

In the same manner as described above for the hydrochloride, other salts are prepared by substituting equivalent quantities of other suitable acids. By "suitable acids" I mean to include those strong enough to give acid addition salts of the 3-amino-4-hydroxyphenylarsen-(anhydro)-oxide which have a pH in aqueous solution not greater than approximately pH 3. By using an excess of polybasic acids, slightly acidic salts are obtained. For example, one can use sulfuric, citric, tartaric, maleic, sulfamic, cevitamic and other non-toxic organic and inorganic acids of this kind, yielding salts which when dried from the frozen state are immediately soluble in water to give a solution having a pH not greater than 3.

What I claim as my invention is:

1. Method for obtaining a stable, dry addition salt of an acid of formula HA with 3-amino-4-hydroxyphenylarsen - (anhydro) - oxide which comprises freezing an aqueous solution of said salt and completely subliming away the ice therefrom under vacuum, A of said formula representing the anion of a non-toxic acid strong enough that aqueous solutions of said addition salt have a pH not greater than about pH 3.

2. Method according to claim 1 wherein the acid HA is a non-toxic mineral acid.

3. Method according to claim 1 wherein the acid HA is a hydrohalic acid.

4. Method according to claim 1 wherein the acid HA is hydrochloric acid.

BENJAMIN F. TULLAR.

REFERENCES CITED

The following references are of record in the file of this patent:

UNITED STATES PATENTS

| Number | Name | Date |
|---|---|---|
| 1,970,956 | Elser | Aug. 21, 1934 |
| 2,066,302 | Reichel | Dec. 29, 1936 |
| 2,092,036 | Tatum | Sept. 7, 1937 |
| 2,099,659 | Reichel | Nov. 16, 1937 |
| 2,149,304 | Masucci | Mar. 7, 1939 |
| 2,221,817 | Scott | Nov. 19, 1940 |
| 2,222,383 | Tullar | Nov. 19, 1940 |
| 2,349,729 | Hopkinson | May 23, 1944 |

FOREIGN PATENTS

| Number | Country | Date |
|---|---|---|
| 260,382 | Great Britain | May 31, 1926 |